United States Patent [19]

Wasserman

[11] 4,062,558
[45] Dec. 13, 1977

[54] UNICYCLE

[76] Inventor: David Wasserman, 1926 Cole Drive, East Meadow, N.Y. 11554

[21] Appl. No.: 706,227

[22] Filed: July 19, 1976

[51] Int. Cl.$^2$ .............................................. B62K 1/00
[52] U.S. Cl. .................................. 280/205; 280/200; 280/252
[58] Field of Search ..................... 280/205, 200, 252

[56] References Cited
U.S. PATENT DOCUMENTS

| 87,355 | 3/1869 | Myers | 280/205 |
|---|---|---|---|
| 360,017 | 3/1887 | Hernandez | 280/205 X |
| 660,835 | 10/1900 | Boes | 280/205 |
| 1,494,504 | 5/1924 | Robbins | 280/205 |
| 2,971,773 | 2/1961 | McKissick | 280/205 |

FOREIGN PATENT DOCUMENTS 392,086  12/1922  Germany .............................. 280/205

Primary Examiner—Joseph F. Peters, Jr.
Assistant Examiner—Terrance L. Siemens
Attorney, Agent, or Firm—Robert D. Farkas

[57] ABSTRACT

This disclosure pertains to a one wheeled vehicle rotatably affixed to a yoke. One arm of the yoke is provided with a stationary foot rest. The other arm of the yoke contains a rack which when reciprocated operates a gear train causing the wheel to rotate. A platform is secured to the uppermost portions of the rack and is biased upwardly by a spring urging the rack in an uppermost position. A pole extends upwardly from the yoke providing steering control to the apparatus and a balancing aid to the user thereof.

5 Claims, 3 Drawing Figures

UNICYCLE

BACKGROUND OF THE INVENTION

1. The Field of the Invention

This invention relates to unicycles and more particularly to that class utilizing a single pedal reciprocally pedally operated by the user.

2. Description of the Prior Art

The prior art abounds with unicycle devices. U.S. Pat. No. 1,652,934 issued on Dec. 13, 1927 to P. E. Gillespie teaches a yolk having a free wheeling wheel journalled to the arms thereof. One of the arms extends outwardly from the plane containing the wheel, providing a foot support for the user. A pole extends outwardly from the center portion of the apparatus for use in balancing and steering the apparatus. This device is not adapted with locomotive means other than the utilization of the momentum otherwise provided by the user by stepping on the ground with his other unsupported foot.

U.S. Pat. No. 638,963 issued on Dec. 12, 1899 to H. Ganswindt discloses a yoke to which a wheel is journalled. A pair of pivotable foot treadles each provide rotating power to the wheel disposed on opposite sides of the wheel adjacent to the ground upon which the wheel periphery rests.

Though both aforementioned Patents provide means for supporting the body of the user above the surface of the earth, and in the case of the Ganswidt Patent, provide means for the pedally induced propulsion of the apparatus by the user, neither Patent permits the user to propel the apparatus and himself whilst totally supported thereby without utilizing a pivoting action at an ankle joint of the user. Furthermore, unicycles disclosed heretofore largely depended upon sprockets and chains for modifying the speed of rotation of the wheel thereof relative to the speed of reciprocation or rotation of the foot operated device utilized to propel the unicycle.

SUMMARY OF THE INVENTION

A primary object of the present invention is to provide a unicycle which utilizes a single vertically reciprocating platform as a means for propulsion of the device.

Another object is to provide a unicycle which employs a gear train to modify the speed of rotation of the wheel from the speed of reciprocating the horizontally disposed pedally operated platform.

Still another object is to provide a unicycle in which both feet of the user are supported above the surface of the ground upon which the device travels.

Yet another object is to provide a unicycle having a balance assisting and steering pole extending upwardly from the yolk portion thereof.

Unicycles at best are difficult to operate due to the expertise required in balancing the user about the point contacting the surface of the earth. Heretofore, the use of conventional pedals or stationary pivoted pedals caused the user to exercise great care to maintain a balanced condition whilst propelling the unicycle. This problem occurs because the user must either cause one or more feet to describe a circle, in the case of a conventional pedal, or to cause a weight imbalance due to the tilting of the foot above the ankle joint, as in the case of a reciprocating pedal. When a reciprocating pedal is used, the user quickly suffers fatigue due to the strenuous activity of the muscles surrounding and adjacent to the ankle joint as the user tries to maintain his balance on the unicycle.

The present invention overcomes these objections by providing a single pedal having a flat platform which moves along a vertical line and, by virtue of a gear train, causes a significant rotation of the wheel when the platform is displaced only moderate amounts. The other leg of the user is supported in a stationary position. The combined supportive effects of the stationary support and the slightly moving horizontal support enables the user to easily maintain his balance without being thrown, in side to side fashion as was heretofore experienced when operating a conventional unicycle.

These objects, as well as other objects of the present invention, will become more readily apparent after reading the following description of the accompanying drawings.

DESCRIPTION OF THE PREFERRED EMBODIMENT

The structure and method of fabrication of the present invention is applicable to a yoke to which a wheel is journalled adjacent the free ends of the arms thereof. One arm of the yoke is adapted with a stationary shaft extending outwardly therefrom and substantially co-axially aligned with the axle of the wheel. The other arm contains a gear train whose output gear is fixedly secured to the axle of the wheel, by way of a one-way clutch, permitting coasting. The input gear of the gear train engages a rack which is slidably supported to operate along a line extending parallel to the length of the other arm. A helical spring is disposed within the housing formed in part by the other arm, having one end thereof secured to the rack and the other end thereof secured to a portion of the interior surface of the housing so as to cause the rack to be biased away from the axle of the wheel. A rod, passing through an opening in the housing, terminates at one end in a plate whose uppermost lateral surface is substantially normal to the aforementioned line. The other end of the rod is secured to the end of the rack furthestmost from the axle of the wheel. A pole extends upwardly from the yoke so as to have its longitudinal axis parallel to the aforementioned line.

The gear train is provided with three gears which when rotated due to the up and down pumping motion applied to the platform by the other foot of the user, allows a point on the wheel's periphery to be displaced a distance some ten times greater than the distance the platform is displaced.

Thus, the user does not upset his perch position by the otherwise required violent pumping action necessary to propel the vehicle. Furthermore, balance is aided by the application of the user's hands grasping the free end of the pole whilst his non-pumping foot is maintained at a point close to the ground.

Figure 1:
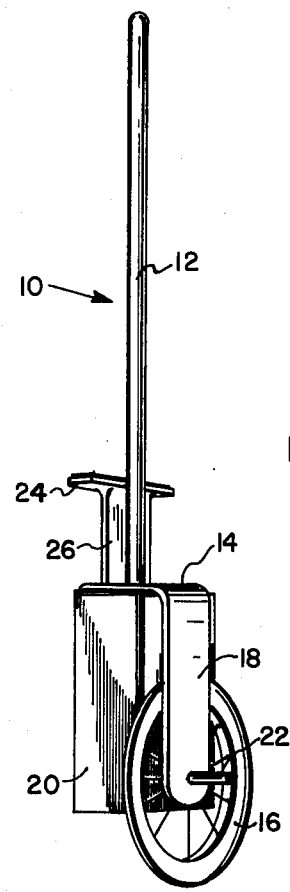
FIG. 1 is a perspective view of the present invention.

Now referring to the Figures, and more particularly to the embodiment illustrated in FIG. 1 showing the present invention 10 having a pole portion 12 extending upwardly from yoke 14. Wheel 16 is journalled to arm 18 and arm 20 of the yoke. Stationary shaft 22 extends outwardly from arm 18 and radially outwardly from the longitudinal axis of pole 12 being disposed substantially co-axially aligned with the axle, not shown, of wheel 16. Platform 24 is shown extending above arm 20 and utilizes rod 26 in support thereof.

Figure 2:
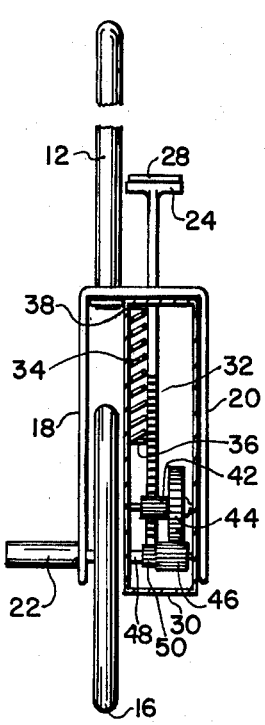
FIG. 2 is a rear elevation view of the present invention.

FIG. 2 illustrates arm 18 to which shaft 22 is affixed. Platform 24 is provided with a rubber-like pad 28 which insures a non-skidding action when a foot of the user is rested thereupon. Arm 22 is secured to housing 30 disposed adjacent wheel 16. Rod 26 is affixed to rack 32. Spring 34 has one end 36 thereof secured to rack 32 whilst end 38 is affixed to the interior portions of housing 30 so as to cause a bias force, in the direction of arrow 40 to be exerted upon rack 32. Pinion 42 meshes with the teeth of rack 32 and is co-axially aligned with and secured to gear 44, both being journalled to housing 30. Pinion 46 is co-axially aligned with axle 48 to which wheel 16 is co-axially aligned and secured thereto. Axle 48 is journalled at one end to arm 20 and at the other end to arm 18. One-way clutch 50 permits axle 48 to be rotated in one direction, and allows the vehicle to coast whilst platform 24 is in a stationary position.

Figure 3:
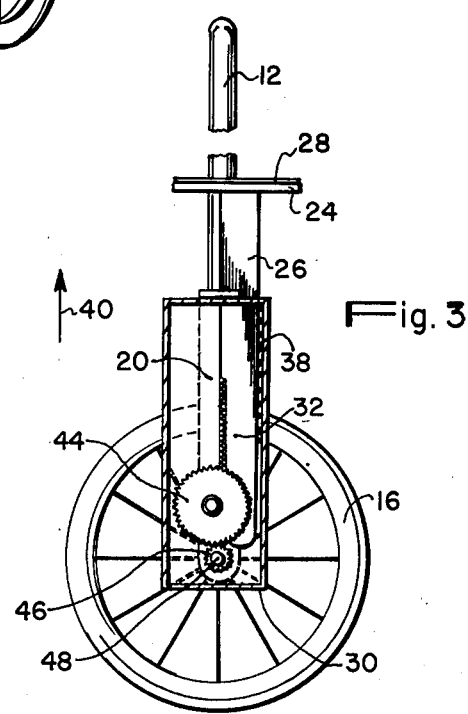
FIG. 3 is a side elevation view of the present invention.

FIG. 3 illustrates housing 30 with the outermost portions thereof removed and arm 20 partially covering rack 32 and gear 44. Pinion 46 is shown extending outwardly from axle 48.

One of the advantages of the present invention is a unicycle which utilizes a single vertically reciprocating platform as a means for propulsion of the device.

Another advantage is a unicycle which employs a gear train to modify the speed of rotation of the wheel from the speed of reciprocating the horizontally disposed pedally operated platform.

Still another advantage is a unicycle in which both feet of the user are supported above the surface of the ground upon which the device travels.

Yet another advantage is a unicycle having a balance assisting and steering pole extending upwardly from the yoke portion thereof.

Thus, there is disclosed in the above description and in the drawings, an embodiment of the invention which fully and effectively accomplishes the objects thereof. However, it will become apparent to those skilled in the art, how to make variations and modifications to the present invention. Therefore, this invention is to be limited, not by the specific disclosure herein, but only by the appending claims.

The embodiment of the invention in which an exclusive privilege or property is claimed are defined as follows:

1. A unicycle comprising a yoke, said yoke having a pair of arms, a wheel, a pole, said wheel having an axle, said axle being journalled to the arms of said yoke, said pole having one end thereof fixedly secured to said yoke, the longitudinal axis of said pole extending at right angles to the longitudinal axis of said axle, a platform, said platform residing in a plane, said plane being maintained perpendicular to said longitudinal axis of said pole, a shaft, said shaft having one end thereof fixedly secured to one of said pair of arms and extending outwardly therefrom, means to slidably support said platform along a line, said line being disposed parallel to said longitudinal axis of said pole, means to rotate said wheel when said platform is displaced along said line, said means to rotate including a rod, a rack, one end of said rod being fixedly secured to said platform, the other end of said rod being fixedly secured to one end of said rack, a gear train, said gear train having an input gear and and an output gear, the teeth of said input gear meshingly engaging the teeth of said rack, a pinion, said pinion fixedly secured and co-axially aligned with said axle, the teeth of said output gear meshingly engaging the teeth of said pinion. and means to bias said platform in a furthestmost position from said axle.

2. The unicycle as claimed in claim 1 wherein said gear train and said rack and said pinion each have pitch diameters causing a point on the periphery of said wheel to be circumferentially displaced a distance ten times greater than the displacement of said platform along said line.

3. The unicycle as claimed in claim 1 further comprising a housing, said housing fixedly secured to the other of said pair of arms, said gear train being journalled to the walls of said housing, said rod passing through an opening in said housing.

4. The unicycle as claimed in claim 3 wherein said means to bias comprises a helical spring, one end of said spring being fixedly secured to an interior surface of said housing, the other end of said spring being fixedly secured to said rack.

5. The unicycle as claimed in claim 1 further comprising a rubber-like pad, said rubber-like pad being fixedly secured to said platform on a lateral surface thereof disposed furthestmost from said axle.

* * * * *